W. H. BOX.
HOISTING MACHINE.
APPLICATION FILED FEB. 3, 1912.
1,097,078.
Patented May 19, 1914.
3 SHEETS—SHEET 1.
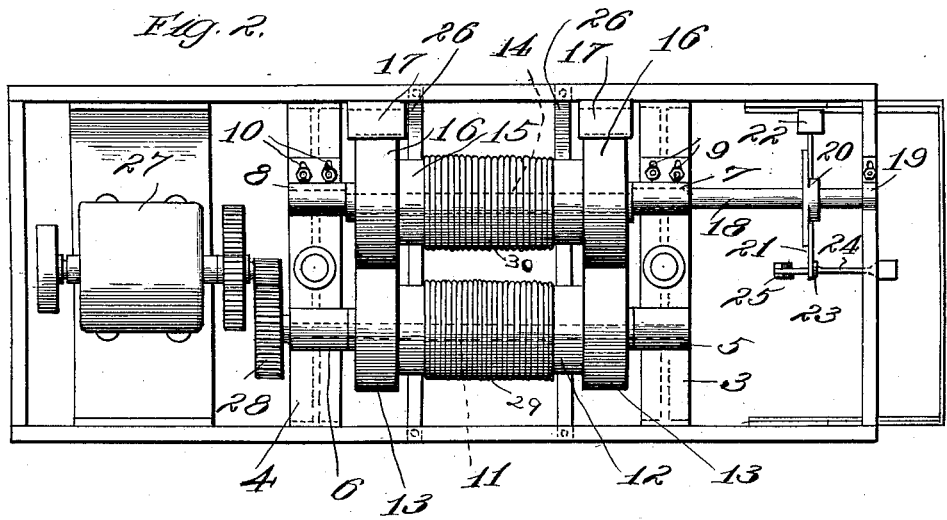
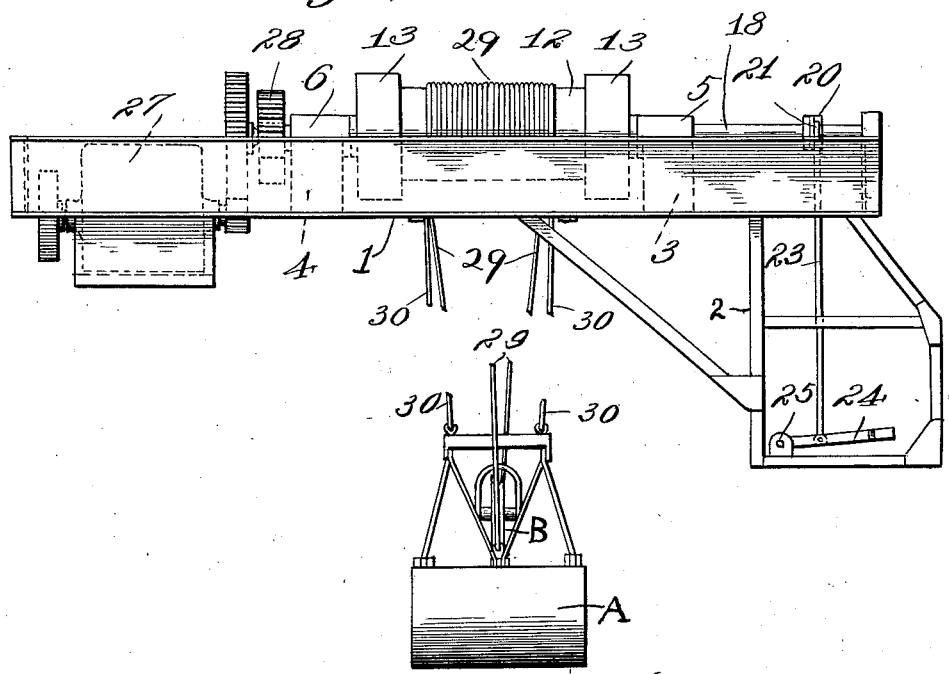
WITNESSES
INVENTOR
William H. Box
By Knight Bro., Attorney

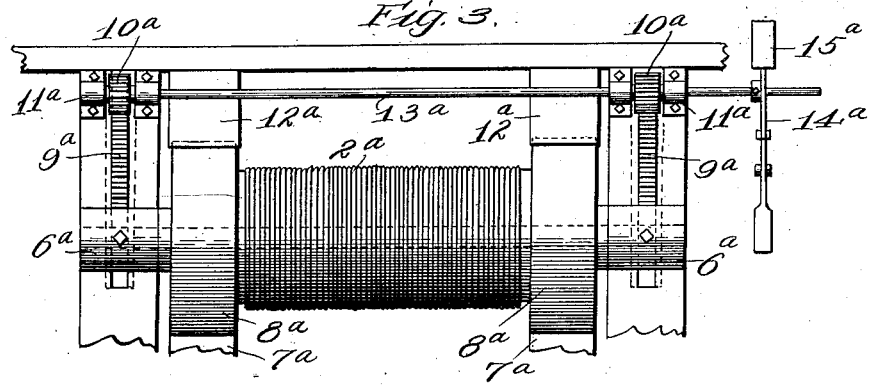
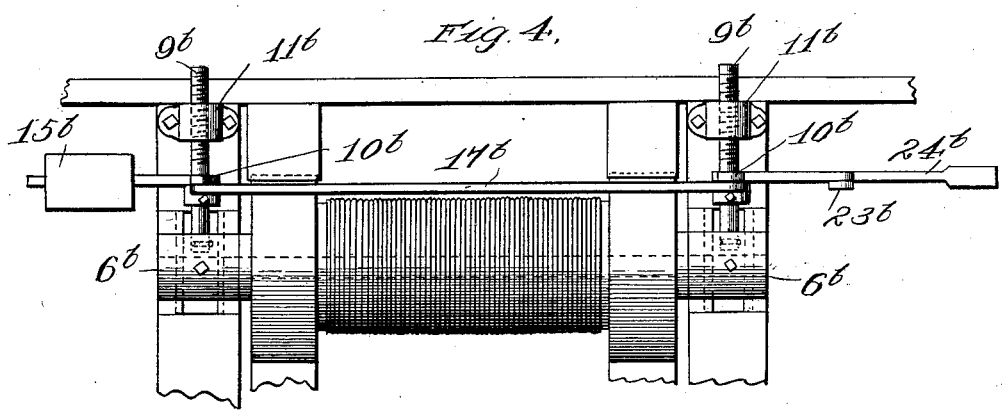
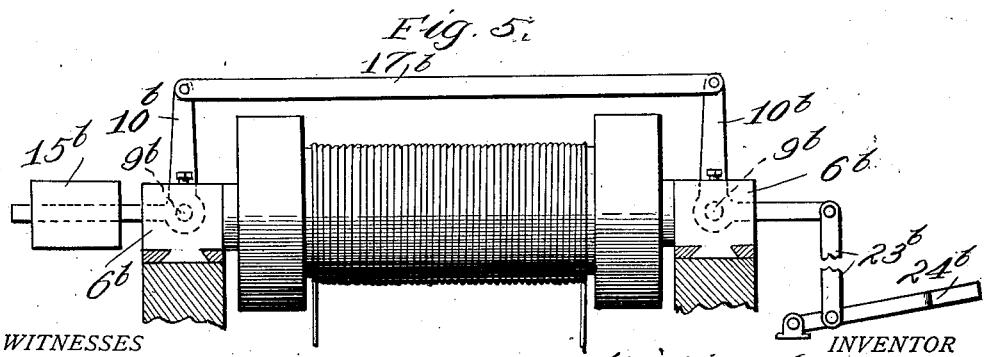

W. H. BOX.
HOISTING MACHINE.
APPLICATION FILED FEB. 3, 1912.
1,097,078.
Patented May 19, 1914.
3 SHEETS—SHEET 3.
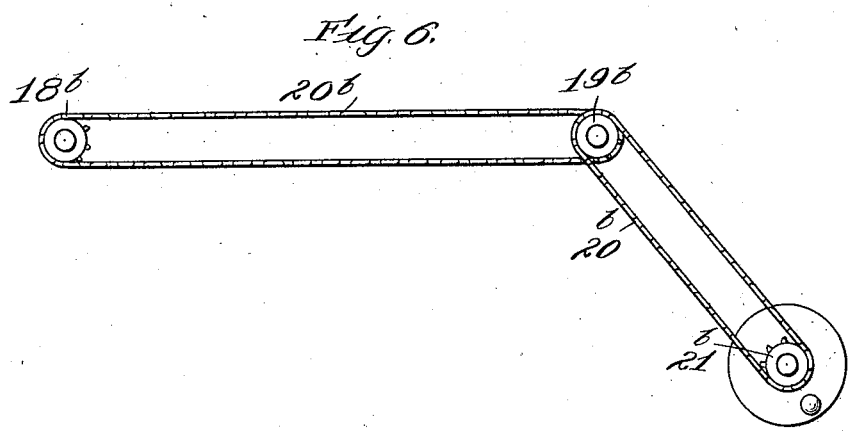
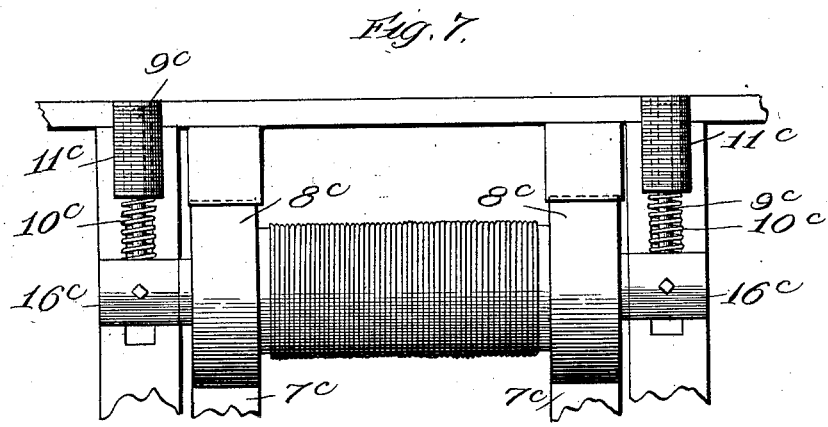
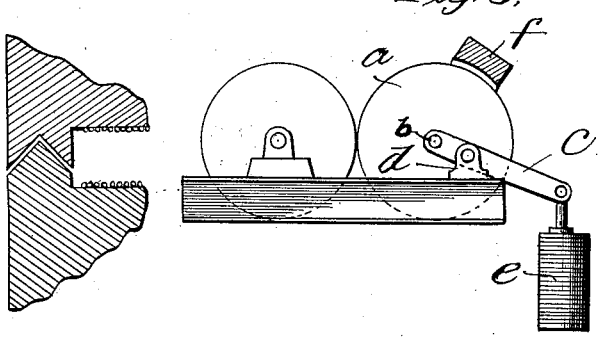
WITNESSES
INVENTOR
William H. Box
By Knight Bros. Attorneys

UNITED STATES PATENT OFFICE.

WILLIAM H. BOX, OF PHILADELPHIA, PENNSYLVANIA.

HOISTING-MACHINE.

1,097,078.   Specification of Letters Patent.   Patented May 19, 1914.

Application filed February 3, 1912. Serial No. 675,296.

*To all whom it may concern:*

Be it known that I, WILLIAM H. BOX, a citizen of the United States, residing at Philadelphia, in the State of Pennsylvania, have invented certain new and useful Improvements in Hoisting-Machines, of which the following is a specification.

The object of my invention is to produce a hoisting machine capable of general utility. That is to say, one which may be used for various purposes.

While I have shown my machine especially adapted for operating a two-line grab bucket, it will be, of course, understood that it may be used for operating a three or four-line grab bucket, or for a lifting magnet. In fact, it may be used for any hoisting purposes.

In the drawing, Figure 1 is a side elevation of a hoisting machine embodying my invention; Fig. 2 is a top plan view of the same; Fig. 3 is a top plan view of a hoist showing another embodiment of means for adjusting the bearings of the loose drum; Fig. 4 is a similar view of another embodiment; Fig. 5 is an end elevation of Fig. 4; Figs. 6 and 7 are similar views of further embodiments of the adjusting means; Fig. 8 is a detail view showing V-shaped friction gears; and Fig. 9 is a further embodiment of my invention.

1 is a suitable carriage which is adapted as an overhead crane carriage, from which depends suitable frame-work 2 constituting an operator's cage or station adapted to travel with the carriage.

3 and 4 are cross beams of the carriage on which are secured stationary bearings 5 and 6. The bearings 7 and 8 are secured to the cross beams 3 and 4 and provided with elongated slots 9 and 10 respectively, whereby the bearings may be adjusted for the purpose of taking up wear in the moving parts of the mechanism.

11 is a shaft journaled in the bearings 5 and 6, on which is keyed a winding drum 12, said drum being provided at each end with an integral toothless gear 13, said gears being of greater diameter than the drum.

14 is an eccentrically mounted shaft journaled in the bearings 7 and 8, on which is loosely journaled a winding drum 15 provided at each end with a toothless gear 16 of greater diameter than the drum. Normally the toothless gears 13 and 16 are spaced a very short distance apart, but at the same time, I would prefer engagement with each other, as shown in Fig. 2.

17 are brake blocks secured to the carriage in line with the toothless gears 16, as clearly shown in Fig. 2. These brakes may be of any suitable construction or type.

18 is a shaft integral with and extending from the shaft 14, its free end being journaled in the bearing 19 on the carriage.

20 is a lever keyed to the shaft 18 provided with an extension 21 and a counterweight 22.

23 is a rod connected to the extension 21 of the lever 20 at its upper end and at its lower end to a foot lever 24 pivoted at 25 in the cage 2.

26 are cable guards to be hereinafter referred to.

27 is a suitable motor mounted on the carriage having driving relation with the shaft 11 by means of the train of gearing 28, whereby one drum, namely, the drum 12 is geared direct to the motor or engine.

In utilizing my improved hoisting machine with a grab bucket, the opening and closing cable 29 is secured to the drum 12, while the lifting cable 30 is secured to the drum 15.

Assuming that the grab bucket is open on the ground ready for scooping, the operator places his foot on the foot treadle 24 to move the eccentric shaft 14 and thus throw the toothless gears 16 into contact with the brakes 17, whereby said gears and drum are held stationary. The controller handle of the motor 27 is thrown over to start the motor, whereupon the drum 12 will revolve and winding up the cables 29 will close the bucket. As soon as the bucket is closed, the operator removes his foot from the foot treadle, whereupon the counter-weight 22 revolves the eccentric shaft 14, thus throwing the toothless gears 16 into contact with the toothless gears 13, whereupon both drums 12 and 15 will revolve in unison. When the bucket is at the desired height, the controller is shut off, whereupon both drums will stop revolving. Now place the foot upon the foot treadle to throw the eccentric shaft and move the toothless gears 16 into contact with the brakes 17 to lock the drum 15 against revolution, then reverse the controller handle, and the drum 12 will be revolved in the opposite direction, whereupon the bucket will be opened by reason of the fact that the cable on the drum 15 is held from unwinding. As soon as the bucket is opened and the load discharged, the foot is removed from the foot treadle, whereupon the counter-weight 22 is free to throw the toothless gears 16 into contact with the toothless gears 13 and both drums will operate in unison so as to lower the open bucket to the ground ready for another load.

The grab bucket A, used for purposes of illustration only, is a standard Haywood bucket. The cable 29 passes around the large sheave wheel B in the center of the bucket and is known as the opening and closing line and, as stated, is wound on drum 12 which is keyed to the main driving shaft 11 and connected through suitable gears to the motor. The two outside cables 30 are fastened to the main framework of the bucket and, as stated, wound on drum 15 and are known as the hoisting lines.

One of the peculiar features about a grab bucket is that when the bucket is opened on the ground scooping up material, the closing rope 29 is wound up first until it shuts the bucket, then both drums are made to rotate in unison, winding ropes 29 and 30, and while it may seem that the two ropes 30 are hoisting the bucket, as a matter of fact the rope 29, after closing the bucket, also hoists the bucket and the drum 15 is only winding up the two slack cables 30 in unison with the cable 29. If the cable 29 is not the tightest when raising the bucket, the bucket would have a tendency to open. For this reason, it will be seen that it will take very little friction to revolve drum 15 as it is only to wind the weight of the cables 30. When the bucket is all the way up and the drum 15 is locked against the brakes 17, and the drum 12 is reversed slacking off the cable 29, then the cables 30 have the entire weight of the bucket, but the load is instantly discharged and the weight thus greatly reduced. Thus it will be seen that the drum 12 sustains the heaviest work and it is for this reason that I have the motor geared directly to it and not to the drum 15 which does very light work.

To utilize my improved hoisting machine in handling a lifting magnet, the wire rope on drum 12 will be attached directly to the magnet for lifting the magnet and the load, while the electric wire for feeding the current to the magnet will be wound on drum 15. The hoisting and lowering of the magnet can be performed by moving the controller in either direction. In this case, the foot of the operator will not be placed upon the foot pedal so that both drums will remain in contact.

To utilize my improved hoisting machine as a single line hoist, the foot pedal can be held down in any suitable manner.

By my construction, it will be obvious that I use only one motor or engine, one standard reversible controller, thus entirely eliminating friction clutches, cone clutches, or brake bands on the gears or drums. The advantage in using a standard reversible controller is that in case of repairs it can be renewed and purchased from any controller builder, while a special controller must be purchased from the original maker.

I may use in place of the toothless gear wheels friction wheels with V-shaped peripheries as shown in Fig. 8.

Referring to Fig. 3, it will be noticed that the same relative position of the two drums is maintained. The purpose of this illustration is to show another embodiment of shifting the gears $8^a$ into driving relation with the gears $7^a$ and consists of a movable bearing $6^a$, to each of which is connected a rack $9^a$ meshing with pinions $10^a$ which are keyed to the shaft $13^a$, said shaft being mounted in suitable bearings $11^a$. $14^a$ is a suitable lever keyed to the shaft $13^a$ and connected with a suitable operating medium, such for instance as a foot pedal, as shown in Fig. 1. $15^a$ is a weight connected to the other end of the lever $14^a$. When the foot is placed on the foot treadle, the shaft $13^a$ is revolved, carrying with it the pinions $10^a$, thus throwing the gears $8^a$ into contact with the brakes $12^a$ and stopping the revolution of the drum $2^a$. When the foot lever is relieved of the pressure of the foot, the weight $15^a$ revolves the shaft $13^a$ and the pinions $10^a$ in the opposite direction, thus moving the drum $2^a$ with its shaft and bearing $6^a$ until the gears $8^a$ are in frictional engagement with the gears $7^a$.

Referring to Figs. 4 and 5. $9^b$ is a coarse pitch steel screw shaft suitably connected with the sliding bearing $6^b$, which screw shaft is rotated either by a bell-crank lever $10^b$, as shown in Fig. 5, or as shown in Fig. 6, by wheels $18^b$ and $19^b$ and the chains $20^b$ connected to a suitable propelling wheel $21^b$. In Fig. 5 the bell-crank levers $10^b$ are connected by a rod $17^b$. The bell-crank lever to the right is connected to a foot pedal $24^b$ by means of the rod $23^b$, while the bell-crank lever to the left is provided with a weight $15^b$ which returns the bell-crank levers to the position shown in Fig. 5, after they have been operated by the foot pedal $24^b$. In Fig. 4, the nut $11^b$ is bolted fast to the cross-beams in which the steel screw shaft $9^b$ revolves.

Referring to Fig. 7, $11^c$ is a solenoid magnet provided with a core $9^c$, said core being connected in a suitable manner to the sliding bearing $16^c$, there being interposed between the sliding bearing and the solenoid magnet, a coil spring $10^c$ positioned around the core $9^c$. The solenoid magnet when magnetized by closing a switch (not shown)

in operator's cage, draws in the core $9^c$ thus moving the bearing $16^c$ so as to move the gears $8^c$ away from the gears $7^c$.

In Fig. 9, I have shown another embodiment of my invention in which the winding drum $a$ is mounted on a straight shaft $b$, the ends of which are journaled on the levers $c$ (one only being shown) which, in turn, are pivotally mounted on the bearings $d$. The outer ends of these levers $c$ are connected to a solenoid $e$ which, when energized, rocks the levers on their bearings and moves the drum away from the other drum as will be understood from the drawing. $f$ is a brake block against which the drum may be moved by the levers $c$. Any system of levers may be substituted for the solenoid as will be obvious from the disclosure in this case.

I claim:—

1. In a hoisting machine, the combination with a hoisting drum connected with a suitable source of power, and a toothless gear on each end of the drum and of greater diameter than the drum, of an eccentrically mounted shaft parallel with the axis of the first named drum, a drum mounted on said shaft, a toothless gear mounted on each end of said drum and of greater diameter than the drum, the toothless gears of the respective drums being normally out of engagement, a hoisting cable on the second named drum and a combined hoisting and appliance operating cable on the first named drum, and means to move the eccentric shaft, whereby the gears of the second named drum are moved into driving engagement with the toothless gears of the first named drum.

2. In a hoisting machine, the combination with a hoisting drum connected with a suitable source of power, and a toothless gear on each end of the drum and of greater diameter than the drum, of an eccentrically mounted shaft parallel with the axis of the first named drum, a drum mounted on said shaft, a toothless gear mounted on each end of said drum and of greater diameter than the drum, the toothless gears of the respective drums being normally out of engagement, an appliance operating cable on the first named drum and a hoisting cable on the second named drum, and means to move the eccentric shaft, whereby the gears of the second named drum are moved into driving engagement with the toothless gears of the first named drum and brakes against which the gears of the second named drum may be moved by means of the eccentric shaft.

3. In a hoisting machine, the combination with a hoisting drum connected to a suitable source of power, and toothless gears for each end of said drum, of a shaft parallel to but eccentric with the shaft of the hoisting drum, a winding drum secured on said eccentric shaft, toothless gears on each end of said winding drum adapted to engage the toothless gears of the hoisting drum, a counter-weighted lever connected with said eccentric shaft and means controlling the movement of said counter-weighted lever, whereby the toothless gears of the respective drums may be thrown into or out of engagement with each other.

4. In a hoisting machine, the combination with a hoisting drum, toothless gears secured on each end of said drum and a motor connected with the shaft of said drum, of a shaft parallel with but eccentric to the shaft of the opening and closing drum, a hoisting drum revolubly mounted on the eccentric shaft, toothless gears on each end of said drum, brakes for the gears on the eccentrically mounted drum, a counter-weighted lever connected with said eccentric shaft, a rod depending from said lever and a foot treadle connected with said rod.

5. In a machine for hoisting appliances, the combination with a frame, a shaft journaled in said frame, a winding drum keyed to said shaft, a motor geared in direct driving relation to said shaft, a combined hoisting and appliance operating cable on said drum, friction gears carried by said drum, a second shaft eccentrically mounted in said frame, a hoisting drum loosely mounted on said second shaft, friction gears on said drum constructed to engage the gears of the first named drum, a lifting cable on said second drum, a counterbalanced operating lever keyed to said second shaft whereby the second shaft may be moved to throw said gears into operative engagement and brakes for said second drum.

The foregoing specification signed at Philadelphia this thirteenth day of January, 1912.

WILLIAM H. BOX.

In presence of two witnesses:
WM. KONZELMANN,
H. B. LADNER.